US011886957B2

(12) United States Patent
Dexter et al.

(10) Patent No.: US 11,886,957 B2
(45) Date of Patent: Jan. 30, 2024

(54) ARTIFICIAL INTELLIGENCE CONTROLLER THAT PROCEDURALLY TAILORS ITSELF TO AN APPLICATION

(71) Applicant: Apple Inc., Cupertino, CA (US)

(72) Inventors: Ross R. Dexter, Cupertino, CA (US); Michael R. Brennan, Cupertino, CA (US); Bruno M. Sommer, Cupertino, CA (US); Norman N. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 867 days.

(21) Appl. No.: 15/334,682

(22) Filed: Oct. 26, 2016

(65) Prior Publication Data

US 2017/0357893 A1      Dec. 14, 2017

Related U.S. Application Data

(60) Provisional application No. 62/348,461, filed on Jun. 10, 2016.

(51) Int. Cl.
*G06N 20/00*       (2019.01)
*A63F 13/35*       (2014.01)
(Continued)

(52) U.S. Cl.
CPC ............ *G06N 20/00* (2019.01); *A63F 13/06* (2013.01); *A63F 13/35* (2014.09); *A63F 2300/5533* (2013.01)

(58) Field of Classification Search
CPC .......... G06N 3/08; G06N 99/00; A63F 13/35; A63F 13/67; G06F 3/0607
See application file for complete search history.

(56) References Cited

U.S. PATENT DOCUMENTS 5,640,592 A  *  6/1997  Rao ...................... G06F 3/0607
                                            710/20
8,200,594 B1 *  6/2012  Bleiweiss ............. G06T 19/003
                                            345/474
(Continued)

FOREIGN PATENT DOCUMENTS

EP          3029614 A1      6/2016
WO     WO-03085545 A1 * 10/2003   ............. G06N 20/00

OTHER PUBLICATIONS

Dai et al, "Personalized Route Recommendation using Big Trajectory Data", 2015, 2015 31st IEEE International Conference on Data Engineering, pp. 543-554. (Year: 2015).*

(Continued)

*Primary Examiner* — Alexey Shmatov
*Assistant Examiner* — Clint Mullinax
(74) *Attorney, Agent, or Firm* — Invoke

(57) ABSTRACT

A method may include receiving a communication from a device at an artificial intelligence controller including state information for a software application component running on the device, the state information including information corresponding to at least one potential state change available to the software application component, and metrics associated with at least one end condition, interpreting the state information using the artificial intelligence controller, and selecting an artificial intelligence algorithm from a plurality of artificial intelligence algorithms for use by the software application component based on the interpreted state information; and transmitting, to the device, an artificial intelligence algorithm communication, the artificial intelligence algorithm communication indicating the selected artificial intelligence algorithm for use in the software application component on the device.

20 Claims, 6 Drawing Sheets

(51) Int. Cl.
*A63F 13/67* (2014.01)
*A63F 13/20* (2014.01)

(56) References Cited

U.S. PATENT DOCUMENTS

| | | | | |
|---|---|---|---|---|
| 2002/0099675 | A1* | 7/2002 | Agrafiotis | G06K 9/6251 706/15 |
| 2005/0245303 | A1* | 11/2005 | Graepel | G06N 3/08 463/1 |
| 2006/0025923 | A1* | 2/2006 | Dotan | G01C 21/32 701/409 |
| 2007/0054717 | A1* | 3/2007 | Youm | A63F 13/57 463/1 |
| 2008/0140595 | A1* | 6/2008 | Park | G06N 3/02 706/25 |
| 2009/0197686 | A1* | 8/2009 | Bergelt | A63F 13/10 463/43 |
| 2011/0183739 | A1* | 7/2011 | Ansari | G07F 17/32 463/16 |
| 2013/0268393 | A1* | 10/2013 | Haze | A63F 13/5375 705/26.7 |
| 2013/0318568 | A1* | 11/2013 | Mahaffey | G06F 21/564 726/3 |
| 2014/0195258 | A1* | 7/2014 | Burton | G06Q 10/0633 705/2 |
| 2016/0036923 | A1* | 2/2016 | Phanishayee | G06F 9/4856 709/217 |
| 2016/0171390 | A1* | 6/2016 | Mohammad Mirzaei | G06F 11/3438 706/12 |
| 2017/0213156 | A1* | 7/2017 | Hammond | G06F 16/951 |

OTHER PUBLICATIONS

Yannakakis Georgios N et al: "A Panorama of Artificial and Computational Intelligence in Games", IEEE Transactions on Computational Intelligence and AI in Games, IEEE, USA, vol. 7. No. 4., Dec. 1, 2015, 315-335.

Marius Lindauer et al: "AutoFolio: An Automatically Configured Algorithm Selector", Journal of Artificial Intelligence Research, Jan. 1, 2015, pp. 745-778.

* cited by examiner

ARTIFICIAL INTELLIGENCE CONTROLLER THAT PROCEDURALLY TAILORS ITSELF TO AN APPLICATION

CLAIM OF PRIORITY

This application is a Non-Provisional of and claims the benefit of priority to U.S. Provisional Application Ser. No. 62/348,461, entitled "AN ARTIFICIAL INTELLIGENCE CONTROLLER THAT PROCEDURALLY TAILORS ITSELF TO AN APPLICATION," filed on Jun. 10, 2016 which is hereby incorporated by reference herein in its entirety.

TECHNICAL FIELD

Embodiments described herein generally relate to artificial intelligence and in particular, but without limitation, to an artificial intelligence controller that selects an artificial intelligence algorithm for a software application component.

BACKGROUND

Many software applications rely on artificial intelligence (AI) to make decisions during normal operation. Games, in particular, use AI to determine state changes controlled by a computer, recommend state changes, and determine strategies. However, software applications are often limited to use of a prearranged AI algorithm for a given situation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Presented herein are systems and methods for using an artificial intelligence (AI) controller to select an AI algorithm for use in a software application component. In the context of this disclosure, an AI controller is a simulated intelligence incorporating algorithms to satisfy conditions. AI in general in this disclosure may include aspects of machine learning, optimization using an objective function, incorporating feedback, or applying an algorithm to determine an output or set of outputs from an input or set of inputs. In this disclosure, an AI algorithm includes algorithms to solve particular technical problems based on state information and at least one end condition of a software application component. The AI algorithms may include, but are not limited to, a minmax algorithm, a Monte Carlo algorithm, a neural net algorithm, a decision tree algorithm, a Q-learning algorithm, or the like.

Figure 1:
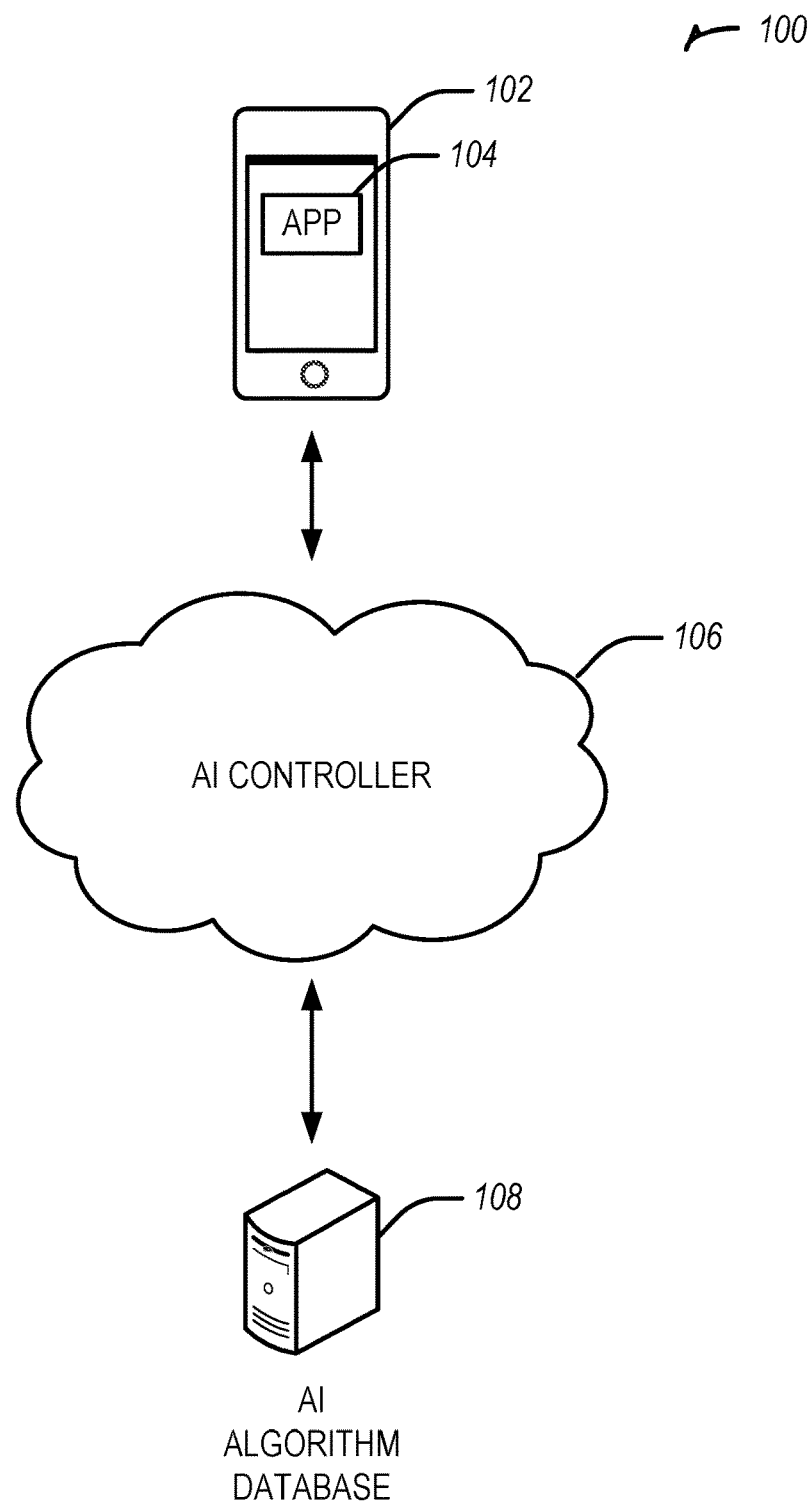
FIG. 1 illustrates an artificial intelligence (AI) algorithm selection system, according to various embodiments.

FIG. 1 illustrates an artificial intelligence (AI) algorithm selection system 100, according to various embodiments. The system 100 includes a device 102, an AI controller 106, and an AI algorithm database 108. In an example, the device 102 is a mobile device. In an example, the AI controller 106 is a network controller. In an example, the device 102 runs a software application, the software application including a software application component 104. For example, the software application may be an app running on a mobile device, such as a game, a recommendation app, a map app, etc. In an example not shown, the device 102 may incorporate the AI controller 106, the AI algorithm database 108, or portions thereof.

In an example, the AI controller 106 receives state information and an end condition and selects an AI algorithm from a plurality of AI algorithms (e.g. from the AI algorithm database 108) for the software application component 104. The state information may include a number of entities in the software application component, what potential state changes are available to each of those entities at a given time (e.g., for a game like chess, moving a piece on the board), or the like. An end condition may include a score for an entity, such as a relative score for a player against other players (e.g., who is winning) a ranking, an absolute score, or a strategic value of a potential state change.

In an example, the AI controller 106 may simulate AI algorithms from the plurality of AI algorithms applied to the software application component 104 or aspects of the software application component 104 to select an AI algorithm. For example an AI algorithm may include a minmax algorithm, which is computationally complex but guaranteed to give an optimal solution or a Monte Carlo algorithm, which is computationally cheap, but gives a potentially suboptimal solution. In an example, if the AI controller 106 determines from the state information that there are many potential state changes and a solution is needed quickly, the AI controller 106 may select the Monte Carlo algorithm. In another example, if the AI controller 106 determines from the state information that an optimal solution is desirable, the AI controller 106 may select the minmax algorithm. For example, an optimal solution would be desirable when possible (e.g., a short computational time to determine the optimal solution), or when accuracy is preferable over timeliness (e.g., when a user selects this preference or when the AI controller 106 determines the current state information implies at a particularly important decision).

In an example, the AI algorithm database 108 may be downloaded to the device 102 periodically, in another example, the software application component 104 may receive a third-party update, which may alter the AI controller 106 to change an AI algorithm, add an AI algorithm, or drop an AI algorithm to be used in the software application component 104. In an example, the state information may be identified by a third-party developer of the software application component. The state information may be filtered or normalized for use with the AI controller.

Figure 2A:
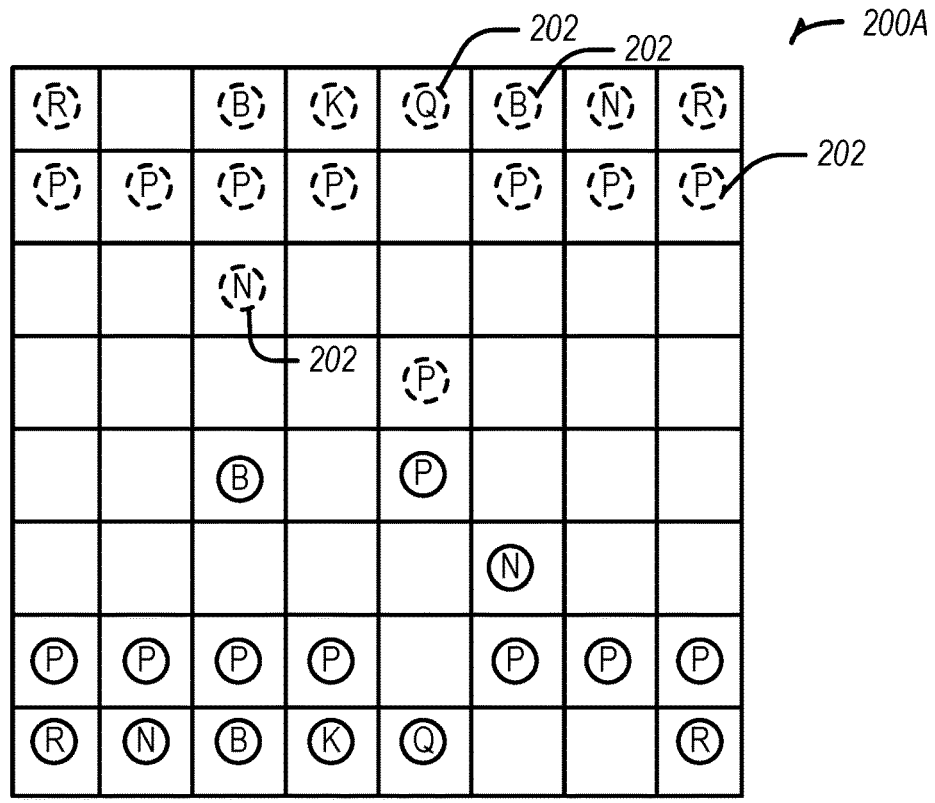
FIGS. 2A-2B illustrate various views of a software application, according to various embodiments.
Figure 2B:
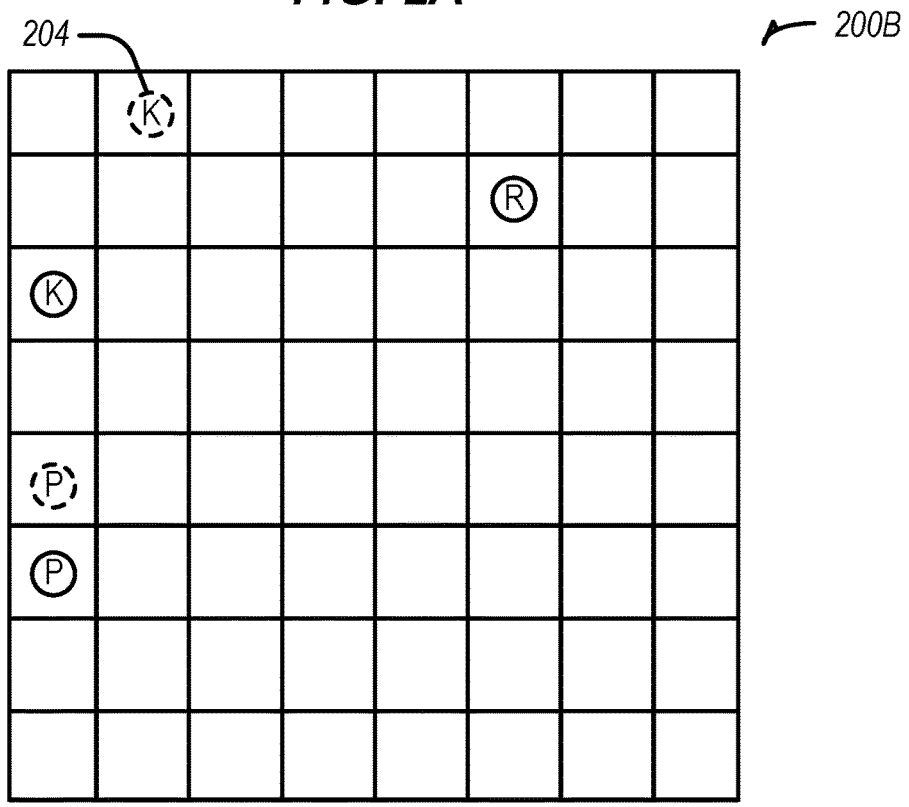

FIGS. 2A-2B illustrate various views of a software application, according to various embodiments. FIG. 2A includes the software application in a first state 200A and FIG. 2B includes the software application in a second state 200B. In the first state 200A, the software application includes relatively more pieces capable of movement than in the second state 200B, which conversely has relatively fewer pieces capable of movement. For example a software application component of the software application depicted in FIGS. 2A-2B may be a chess game. Using the chess game as an example, in the first state 200A, there are many pieces 202 that may move or remain still. These potential movements may represent potential state changes available to the software application component. In chess, the objective is to checkmate the opposite king, which may represent an end condition. Another end condition in chess is a draw, which may be a best remaining outcome for a particular side. The second state 200B, in contrast to the first state 200A, has only one remaining moveable piece 204 when it is the top side's turn. The piece 204 may only legally move to one of the two adjacent squares, left or right.

An AI algorithm may be used for various purposes in the software application component. In an example, the AI algorithm may be used to recommend one or more potential moves to a player-controlled side. In another example, the AI algorithm may be used to determine a next move for a computer-controlled side. Given a number of potential state changes (moves) for the top side, a particular AI algorithm may be more appropriate than others.

For example, in the first state 200A, exhaustively running an algorithm to find a solution to the board that guarantees a particular end condition, such as a minmax algorithm, may take too long to run on a device, may be difficult or impossible to implement, or may require more processing power than is available. Instead, given the potential state changes in the first state 200A, an AI controller may select an approximating AI algorithm, such as a Monte Carlo algorithm.

In other examples, the software application component may be another type of game or app, and may include other types of potential state changes or end conditions. In an example, a predetermined skill level for a side or a particular strategy may be used as state information to select an appropriate AI algorithm. For example, a strategy may include focusing on performance, high quality, trap avoidance, minimizing time, effectiveness of the AI (e.g., ruthlessness), such as high difficulty, medium, or low, balanced performance, or the like.

The chess example shown in FIGS. 2A-2B is a turn-based game. In another example, a real-time solution may be given for real-time gains. For example, the AI controller may be given a small time constraint, such as to reevaluate periodically (e.g., every $10^{th}$ of a second or so) and output a strategy based on state changes and the small time constraint.

As the example game illustrated in FIGS. 2A-2B progresses from the first state 200A to the second state 200B and the state information changes, an AI algorithm that was selected at the first state 200A may no longer be a proper AI algorithm for the second state 200B. The AI controller may dynamically change the AI algorithm, such as in response to each state change represented by a move, skill level change, possible end conditions, or the like. The dynamic change of AI algorithm provides for a degree of flexibility, such as for an AI opponent, that is more accurate or provides a better experience (e.g., matches the skill level of a player) or performance than relying on any one AI algorithm for the duration of the game.

Figure 3:
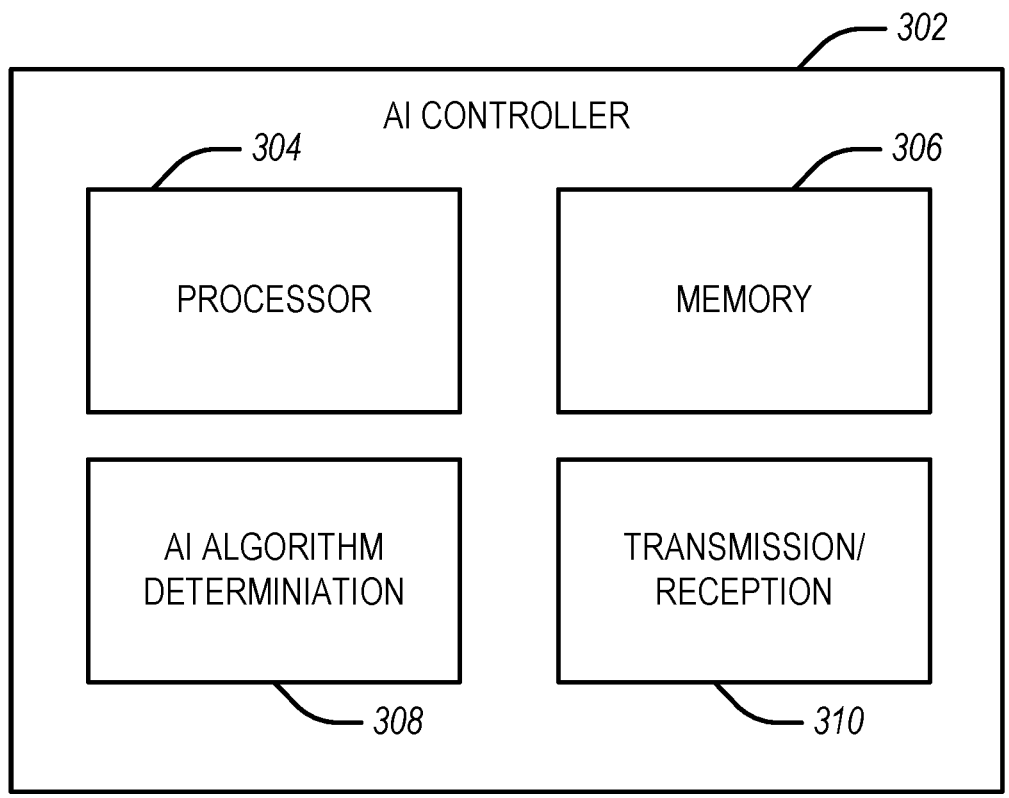
FIG. 3 illustrates an AI controller, according to various embodiments.

FIG. 3 illustrates an AI controller 302, according to various embodiments. The AI controller 302 includes a processor 304 and memory 306. The AI controller 302 includes AI algorithm determination component 308 and transmission reception component 310, which may be implemented by the processor 304. The AI controller 302 may be used to select an AI algorithm from a plurality of AI algorithms for use in a software application component. For example, the transmission reception component 310 may be used to receive a communication from a device including state information for a software application component running on the device, the state information including information corresponding to at least one potential state change available to the software application component, and metrics associated with at least one end condition.

The AI algorithm determination component 308 may be used to interpret the state information and select an AI algorithm from a plurality of AI algorithms for use by the software application component based on the interpreted state information. The transmission reception component 310 may be used to transmit an AI algorithm communication indicating the selected AI algorithm (e.g., selected by the AI determination component 308) for use in the software application component on the device. The plurality of AI algorithms may be stored in the memory 306, or in an external database. The processor 304 may be used to implement the components 308 or 310 to perform operations. In an example, the AI controller 302 may be run as a network service, run on a local device, or run partially as a cloud service and partially on a local device.

Figure 4:
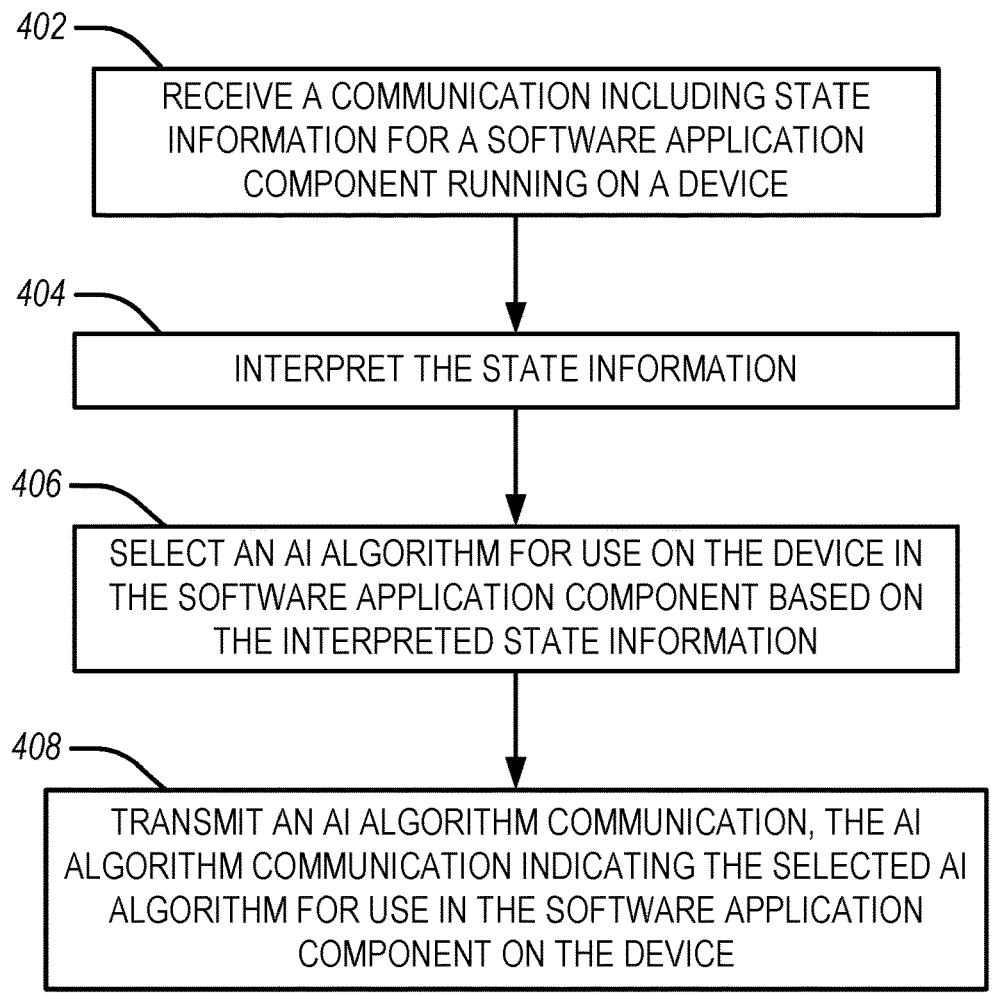
FIG. 4 illustrates a flowchart of a method to select an AI algorithm for use in a software application component, according to various embodiments.

FIG. 4 illustrates a flowchart of a method 400 to select an AI algorithm for use in a software application component, according to various embodiments. At operation 402, the method 400 includes receiving a communication from a device, the communication including state information (e.g., such as a structured file format like XML) for a software application component running on the device. In an example, the state information includes information corresponding to at least one potential state change available to the software application component, and metrics associated with at least one end condition. The at least one potential state change may include a move for a piece in a game, a group of moves, a street or turn in a map, a rating, etc. The at least one end condition may include conditions to cause a game to come to an end, a destination on a map, a recommendation for a restaurant or attraction to visit, or the like.

For example, using a map app, an end condition may include finding an optimal route (e.g., quickest, least traffic, no highways, etc.) to a destination. The potential state changes include streets, turns, etc., To find the optimal route, the AI controller may provide each AI algorithm the possible routes, and select which AI algorithm should be used to predict the optimal route given the potential state changes, time limits, computational limits, etc. In another example, the method 400 may include determining an AI algorithm for use in routing airplanes, packages, or other shipments or traffic to find the optimal routes to get to different locations.

In an example, the at least one potential state change available to the software application component includes an active potential state change where a representative entity changes a position with respect to a game area (e.g., a game area on a display, a stored representation of a game area, a map, or the like) and an inactive potential state change where a representative entity remains still. For example, in a game, a potential state change may include a move or inaction by a piece. In an example, the metrics associated with the at least one end condition include at least one of a relative set of scores, an absolute set of scores, or a ranking of players. In an example, the software application component is a game and the state information for the software application component includes a win condition.

At operation 404, the method 400 includes interpreting the state information. In an example, interpreting the state information includes parsing the state information. At operation 406, the method 400 includes selecting an AI algorithm from a plurality of AI algorithms for use by the software application component based on the interpreted state information.

In an example, selecting the AI algorithm includes comparing the state information to conditions in a database. The conditions may include previously used AI algorithms for given state information, including relative success or satisfaction with the AI algorithms and the given state information. The conditions may include threshold potential state changes (e.g., when above a threshold, a first set of AI algorithms is included in the plurality of AI algorithms and when below the threshold, a second set of AI algorithms is included in the plurality of AI algorithms). The conditions may change depending on the software application component where the AI algorithm is to be applied (e.g., the plurality of AI algorithms may be predetermined for a specific software application component or for a type of software application component).

In another example, an AI controller may determine and associate a score for the plurality of AI algorithms and select an AI algorithm based on the score. In one example an AI algorithm with the highest (or lowest) score is selected. The determined score may be dependent on the potential state changes or the end condition, computational complexity, an anticipated or approximate time to an output, a skill level, or the like. In an example, selecting the AI algorithm includes evaluating a computational complexity of simulating the software application component using the state information for the plurality of AI algorithms. In an example, the AI algorithm is selected from a minmax algorithm, a Monte Carlo algorithm, a neural net algorithm, a decision tree algorithm, a Q-learning algorithm, or the like.

At operation 408, the method 400 includes transmitting an AI algorithm communication, the AI algorithm communication indicating the selected AI algorithm for use in the software application component on the device. In an example, the AI algorithm communication includes at least one AI algorithm. In another example, the AI algorithm communication includes an identity of at least one AI algorithm that is stored locally on the device.

Figure 5:
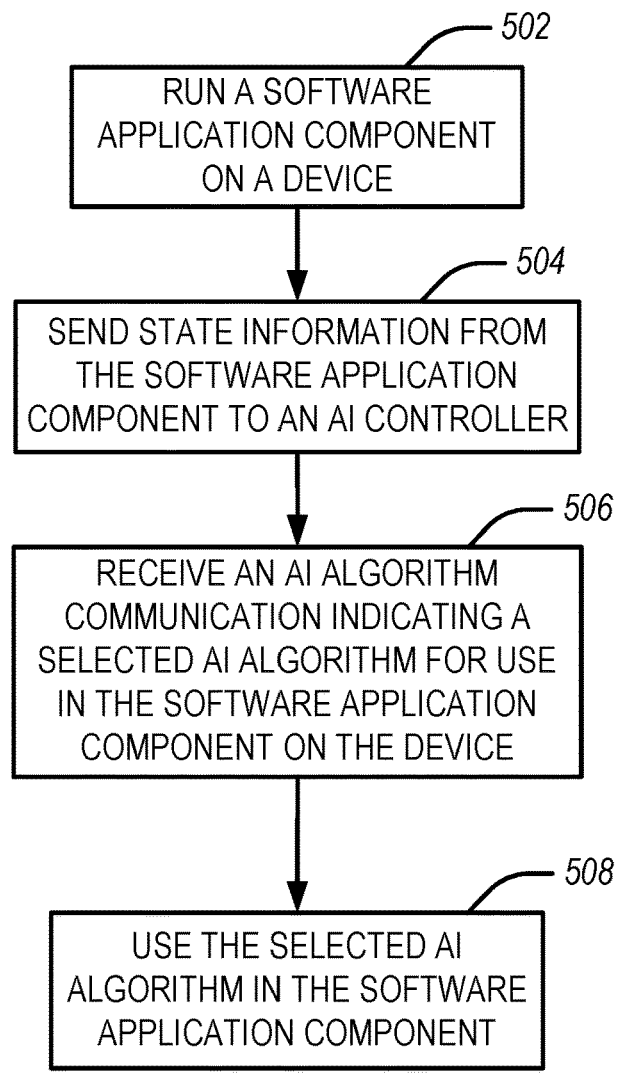
FIG. 5 illustrates a flowchart of a method to use a selected AI algorithm in a software application component, according to various embodiments.

FIG. 5 illustrates a flowchart of a method to use a selected AI algorithm in software application component, according to various embodiments. At operation 502, the method 500 includes running a software application component on a device. At operation 504, the method 500 includes sending state information from the software application component to an AI controller. Operation 504 may include selecting state information to send to the AI controller. For example, the software application component may select some state information to send and exclude other state information based on predetermined criteria specific to the software application component. At operation 506, the method 500 includes receiving an AI algorithm communication indicating a selected AI algorithm for use in the software application component on the device. The AI algorithm communication may include the AI algorithm or may include an identifier of the AI algorithm, which may be stored locally on the device.

At operation 508, the method 500 includes using the selected AI algorithm in the software application component. The selected AI algorithm may be a previously unused AI algorithm or may be an AI algorithm already previously used. To implement the selected AI algorithm in the software application component, the software application component may run scenarios or probabilities using the selected AI algorithm on current state information of the software application component. For example, the software application component may use the selected AI algorithm to determine and recommend a state change, to determine a computer-controlled state change, or determine and recommend a strategy (e.g., a plurality of state changes or a potential future state change).

EXAMPLE COMPUTER SYSTEM

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
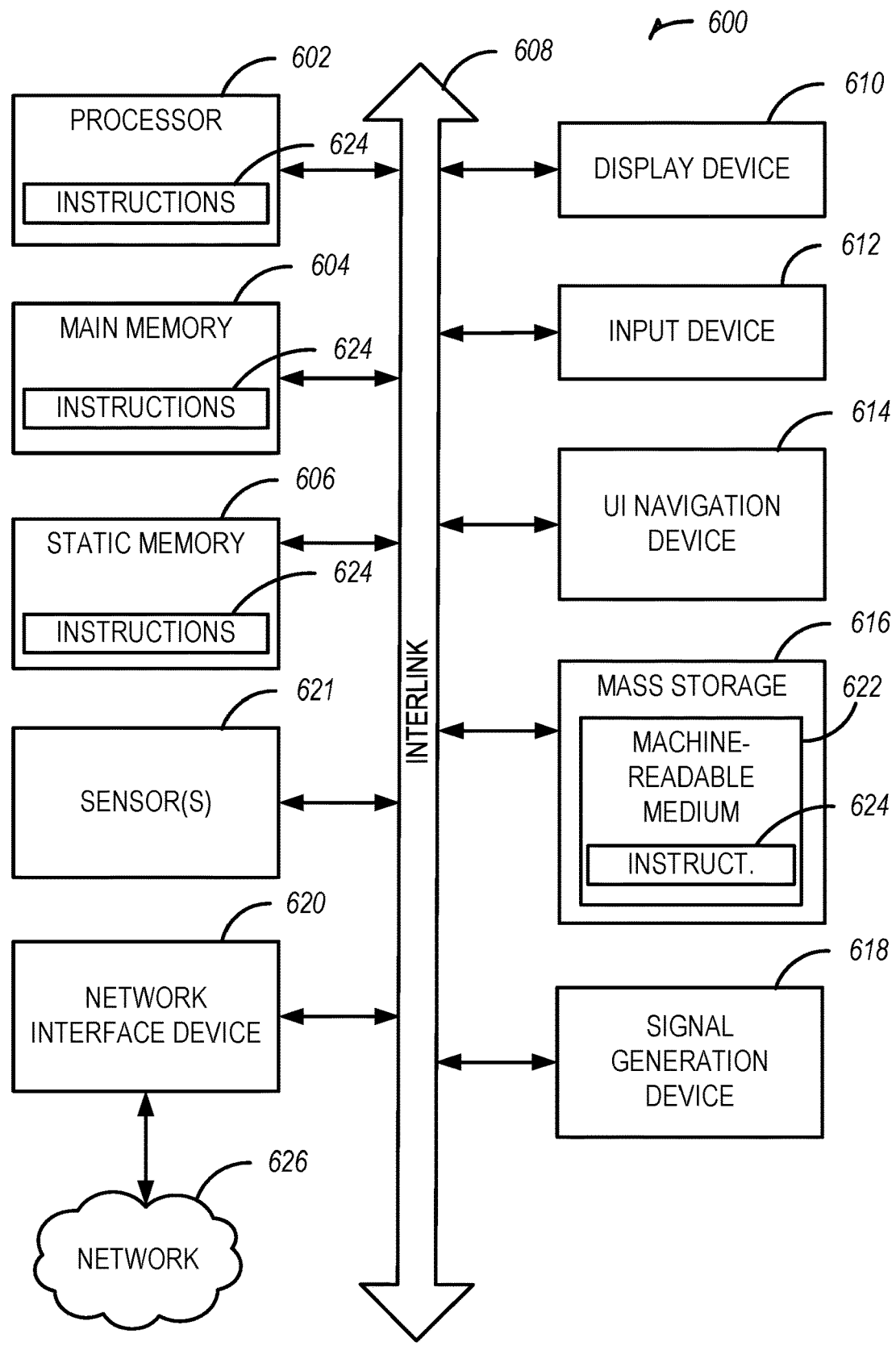
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    receiving a communication from a device at an artificial intelligence (AI) controller including state information for a software application component running on the device, the state information comprising:
        a plurality of entities that are provided by the software application component for interaction with by a user;
        a plurality of potential state changes that are available to each respective entity of the plurality of entities at a given time based on user input; and
        metrics associated with at least one end condition;
    interpreting the state information using the AI controller;
    associating, by the AI controller, scores for each of a plurality of AI algorithms for use by the software application component, each score being based on:
        the interpreted state information including the plurality of potential state changes that are available to each respective entity of the plurality of entities; and
        a computational complexity of simulating the software application component using the state information for each of the plurality of AI algorithms including an estimated amount of time for simulation;
    selecting, by the AI controller, an AI algorithm from the plurality of AI algorithms based on the scores; and
    transmitting, to the device, an AI algorithm communication, the AI algorithm communication indicating the selected AI algorithm for use in the software application component on the device.

2. The method of claim 1, wherein the AI algorithm communication includes the selected AI algorithm, and wherein the metrics are selected from a group comprising a relative set of scores and an absolute set of scores.

3. The method of claim 1, wherein associating scores for each of the plurality of AI algorithms for use by the software application component is further based on:
comparing the interpreted state information to stored conditions, the stored conditions comprising:
a threshold for the plurality of potential state changes, wherein the plurality of AI algorithms comprises a first set of AI algorithms responsive to the plurality of potential state changes being below the threshold and a second set of AI algorithms different from the first set of AI algorithms responsive to the plurality of potential state changes being at least the threshold;
AI algorithms previously used for specific state information; and
relative success of each AI algorithm for the specific state information.

4. The method of claim 1, wherein the plurality of potential state changes includes an active potential state change where a representative entity changes a position with respect to a game area and an inactive potential state change where a representative entity remains still with respect to the game area.

5. The method of claim 1, wherein the software application component is a mapping application, the at least one end condition comprises finding an optimal route to a final destination, and the plurality of potential state changes comprises route choices that each include a series of state changes.

6. The method of claim 1, further comprising estimating, by the AI controller, the computational complexity of simulating the software application component using the state information for each of the plurality of AI algorithms.

7. The method of claim 1, wherein selecting the AI algorithm from the plurality of AI algorithms is further based on a user-selected preference.

8. A system comprising:
at least one processor;
a storage device comprising instructions, which when executed by the at least one processor, configure the at least one processor to:
receive a communication, at an artificial intelligence (AI) controller from a device, including state information for a software application component running on the device, the state information comprising:
a plurality of entities that are provided by the software application component for interaction with by a user;
a plurality of potential state changes that are available to each respective entity of the plurality of entities at a given time based on user input; and
metrics associated with at least one end condition;
interpreting the state information using the AI controller;
associating, by the AI controller, scores for each of a plurality of AI algorithms for use by the software application component, each score being based on:
the interpreted state information including the plurality of potential state changes that are available to each respective entity of the plurality of entities; and
a computational complexity of simulating the software application component using the state information for each of the plurality of AI algorithms including an estimated amount of time for simulation;
select an AI algorithm from the plurality of AI algorithms based on the scores; and
transmit, to the device, an AI algorithm communication, the AI algorithm communication indicating the selected AI algorithm for use in the software application component on the device.

9. The system of claim 8, wherein the AI algorithm communication includes the selected AI algorithm, and wherein the metrics are selected from a group comprising a relative set of scores and an absolute set of scores.

10. The system of claim 8, wherein associating scores for each of the plurality of AI algorithms for use by the software application component is further based on:
comparing the interpreted state information to stored conditions, the stored conditions comprising:
a threshold for the plurality of potential state changes, wherein the plurality of AI algorithms comprises a first set of AI algorithms responsive to the plurality of potential state changes being below the threshold and a second set of AI algorithms different from the first set of AI algorithms responsive to the plurality of potential state changes being at least the threshold;
AI algorithms previously used for specific state information; and
relative success of each AI algorithm for the specific state information.

11. The system of claim 8, wherein the plurality of potential state changes includes an active potential state change where a representative entity changes a position with respect to a game area and an inactive potential state change where a representative entity remains still with respect to the game area.

12. The system of claim 8, wherein the software application component is a mapping application, the at least one end condition comprises finding an optimal route to a final destination, and the plurality of potential state changes comprises route choices that each include a series of state changes.

13. The system of claim 8, wherein the instructions further configure the at least one processor to estimate the computational complexity of simulating the software application component using the state information for each of the plurality of AI algorithms.

14. The system of claim 8, wherein selecting the AI algorithm from the plurality of AI algorithms is further based on a user-selected preference.

15. A non-transitory machine-readable medium comprising instructions, which when executed by the at least one processor, configure the at least one processor to:
receive a communication, at an artificial intelligence (AI) controller from a device, including state information for a software application component running on the device, the state information comprising:
a plurality of entities that are provided by the software application component for interaction with by a user;
a plurality of potential state changes that are available to each respective entity of the plurality of entities at a given time based on user input; and
metrics associated with at least one end condition;
interpreting the state information using the AI controller;
associating, by the AI controller, scores for each of a plurality of AI algorithms for use by the software application component, each score being based on:
the interpreted state information including the plurality of potential state changes that are available to each respective entity of the plurality of entities; and a computational complexity of simulating the software application component using the state information for each of the plurality of AI algorithms including an estimated amount of time for simulation;

select an AI algorithm from the plurality of AI algorithms based on the scores; and transmit, to the device, an AI algorithm communication, the AI algorithm communication indicating the selected AI algorithm for use in the software application component on the device.

16. The machine-readable medium of claim 15, wherein the AI algorithm communication includes the selected AI algorithm, and wherein the metrics are selected from a group comprising a relative set of scores and an absolute set of scores.

17. The machine-readable medium of claim 15, wherein associating scores for each of the plurality of AI algorithms for use by the software application component is further based on:

comparing the interpreted state information to stored conditions, the stored conditions comprising:

a threshold for the plurality of potential state changes, wherein the plurality of AI algorithms comprises a first set of AI algorithms responsive to the plurality of potential state changes being below the threshold and a second set of AI algorithms different from the first set of AI algorithms responsive to the plurality of potential state changes being at least the threshold;

AI algorithms previously used for specific state information; and relative success of each AI algorithm for the specific state information.

18. The machine-readable medium of claim 15, wherein the plurality of potential state changes includes an active potential state change where a representative entity changes a position with respect to a game area and an inactive potential state change where a representative entity remains still with respect to the game area.

19. The machine-readable medium of claim 15, wherein the software application component is a mapping application, the at least one end condition comprises finding an optimal route to a final destination, and the plurality of potential state changes comprises route choices that each include a series of state changes.

20. The machine-readable medium of claim 15, wherein the instructions further configure the at least one processor to estimate the computational complexity of simulating the software application component using the state information for each of the plurality of AI algorithms.

* * * * *